United States Patent [19]

Brady

[11] Patent Number: 4,485,845
[45] Date of Patent: Dec. 4, 1984

[54] QUICK DISCONNECT COUPLING

[75] Inventor: Kenneth T. Brady, Lincoln, Nebr.

[73] Assignee: Imperial Clevite Inc., Glenview, Ill.

[21] Appl. No.: 419,919

[22] Filed: Sep. 20, 1982

[51] Int. Cl.³ ............................................. F16L 37/28
[52] U.S. Cl. ................................ 137/614.04; 285/316
[58] Field of Search ...................... 137/614.04, 614.03, 137/614.02; 285/277, 316

[56] References Cited

U.S. PATENT DOCUMENTS

| 2,797,110 | 6/1957 | Covington | 285/277 |
| 2,972,491 | 2/1961 | Dutton | 285/316 |
| 3,100,655 | 8/1963 | Work | 285/316 |
| 3,201,147 | 8/1965 | De Cenzo | 285/277 |
| 4,240,466 | 12/1980 | Herzan et al. | 137/614.04 |

FOREIGN PATENT DOCUMENTS 2447530  4/1975  Fed. Rep. of Germany ...... 285/316

Primary Examiner—A. Michael Chambers
Attorney, Agent, or Firm—Russell E. Baumann

[57] ABSTRACT

A female quick disconnect coupling includes a locking mechanism which requires different forces to connect and disconnect a male coupling. A tubular housing is slidably mounted within a sleeve, and a pair of coil springs are mounted between the housing and the sleeve. Only one of the springs is compressed as the housing moves in one direction within the sleeve to permit a male coupling to be connected to the female coupling. Both springs are compressed as the housing moves in the other direction to permit the male coupling to be disconnected, thereby requiring a relatively high force to disconnect the couplings.

5 Claims, 4 Drawing Figures

QUICK DISCONNECT COUPLING

BACKGROUND AND SUMMARY

This invention relates to quick disconnect couplings, and, more particularly, to a female quick disconnect coupling which requires distinctly different forces to connect and disconnect a male coupling.

Quick disconnect couplings are used, for example, to connect hydraulic fluid line hoses. When the male and female couplings on the ends of a pair of hoses are connected, fluid can flow through the hoses. When the couplings are disconnected, valves within the couplings close and prevent fluid from escaping.

Quick disconnect couplings are so named because the male and female couplings can be quickly connected and disconnected by simple pushing and pulling forces. In many applications it is desirable to have a relatively low push force to connect the couplings and a relatively high pull force to disconnect the couplings. This is desirable, for example, so that normal movement of the hoses and slight pulling forces on the hoses will not accidentally disconnect the couplings. However, a severe pull will disconnect the couplings and prevent tensile failure to the hoses.

U.S. Pat. No. 4,240,466 describes a coupling which provides two different connecting and disconnecting forces. However, the present invention provides a much shorter, more compact design which uses fewer parts. A female coupling includes an outer sleeve and a tubular housing which is slidably mounted within the sleeve. A radially inwardly extending locking portion on the sleeve is engageable with locking balls on the housing, and the housing is movable between a coupled position, in which the locking balls are forced inwardly by the sleeve to lock a male coupling, and partially coupled and partially uncoupled positions in which the locking balls are free to move outwardly. A pair of coil springs are mounted between the housing and the sleeve. Only one of the coil springs is compressed when the housing moves from its uncoupled position to its partially coupled position to provide a relatively low connecting force, and both springs are compressed when the housing moves from its coupled position to its partially uncoupled position to provide a relatively high disconnecting force. The springs return the housing to its coupled position when the connecting or disconnecting force is released.

DESCRIPTION OF THE DRAWING

The invention will be explained in conjunction with an illustrative embodiment shown in the accompanying drawing, in which.

DESCRIPTION OF THE SPECIFIC EMBODIMENT

Figure 1:
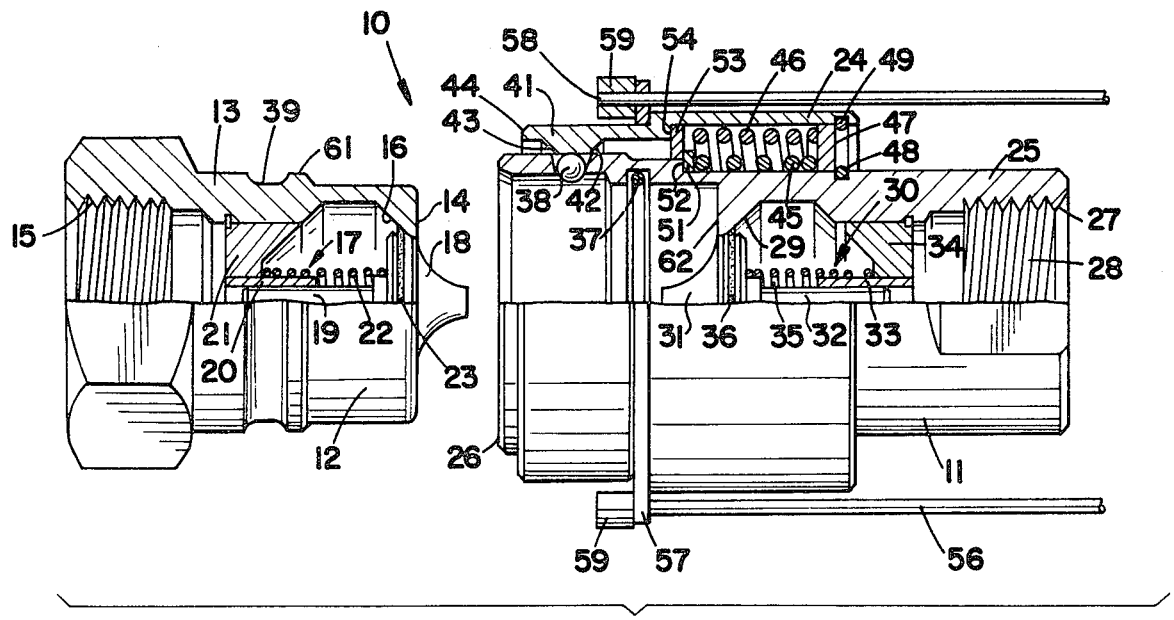
FIG. 1 is a side view, partially in section, of a female coupling and a male coupling.

Referring first to FIG. 1, the numeral 10 designates generally a quick connect and disconnect coupling which includes a female coupling 11 and a male coupling 12. The male coupling 12 includes a generally tubular housing 13 having an outer end 14 and an internally threaded inner end 15 which can be screwed onto a fluid hose. A valve seat 16 is provided at the outer end, and a conventional valve assembly 17 closes the fluid passage through the housing. The valve assembly includes a generally frusto-conical valve 18 which is mounted on a stem 19. The stem 19 is slidable within a sleeve 20 which is supported within the housing by a spider 21. A spring 22 biases the valve into engagement with the valve seat, and an O-ring 23 on the valve sealingly engages the valve seat.

The female coupling 11 includes an outer generally cylindrical sleeve 24 and a generally tubular housing 25 which is slidable axially within the sleeve. The housing includes an outer end 26 and an internally threaded inner end 27 which is adapted to be connected to a fluid hose. The housing is provided with an internal bore 28 and a valve seat 29. A valve assembly 30 similar to the valve assembly 17 is mounted within the housing for closing the fluid passage through the housing. The valve assembly 30 includes a generally frusto-conical valve 31 mounted on a stem 32. The stem 32 is slidably supported by a sleeve 33 which is supported by a spider 34, and a spring 35 urges the valve against the valve seat 29. An O-ring 36 is mounted on the valve for engaging the valve seat, and an O-ring 37 is mounted within an annular recess in the inside wall of the housing for sealingly engaging the male coupling.

Figure 3:
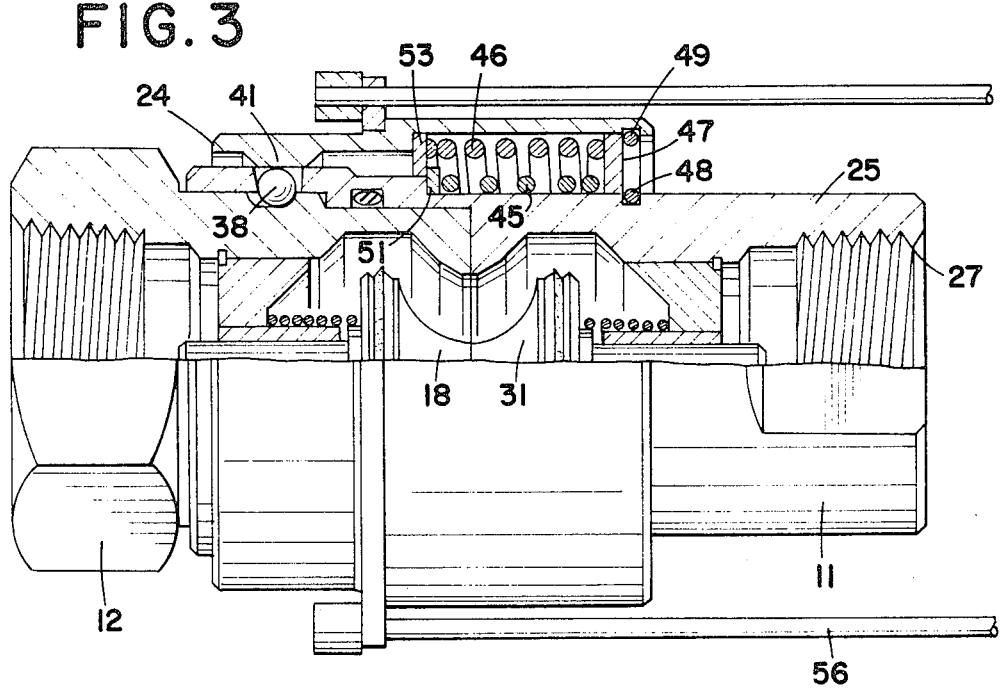
FIG. 3 is a side view, partially in section, showing the male coupling connected to the female coupling.

As will be explained more fully hereinafter, the male coupling and the female coupling are locked together as shown in FIG. 3 by a plurality of locking balls 38 which are mounted in holes in the female housing 25 and which are forced by the outer sleeve 24 into a groove 39 in the outside surface of the male coupling. The sleeve 24 includes a radially inwardly extending locking portion 41 adjacent its outer end 44, and the locking portion is provided with inner and outer camming surfaces 43 and 42 (FIG. 1).

A pair of coil springs 45 and 46 are positioned between the sleeve 24 and the housing 25. The spring 45 has a diameter slightly larger than the outside diameter of the housing, and the spring 46 has a diameter slightly smaller than the inside diameter of the sleeve. A clearance is provided between the springs to permit the inner spring 45 to be compressed without interference from the outer spring 46.

The inner ends of the springs engage an annular washer 47, and in FIG. 1 the washer 47 abuts a stop ring 48 which is mounted in a groove in the housing 25 and a stop ring 49 which is mounted in a groove in the sleeve 24. The washer 47 is sized so that it can slide axially with respect to both the housing 25 and the sleeve 24. The outer end of the spring 45 engages an annular washer 51 which is slidable on the outer surface of the housing 25 and which, in FIG. 1, abuts a stop shoulder 52 on the housing. The outer end of the spring 46 engages an annular washer 53 which is slidable on the inner surface of the sleeve 24 and which abuts a stop shoulder 54 on the sleeve. The inside diameter of the washer 53 is smaller than the outside diameter of the washer 51 so that the washer 51 cannot move to the left beyond the washer 53.

A U-shaped lanyard 56 is attached to an annular collar 57 on the outside of the sleeve 24. Each of the ends 58 of the lanyard extends through an opening in the collar and is prevented from being withdrawn from the collar by ends caps 59.

In use the female coupling is connected to a hose on, for example, an agricultural implement. The lanyad 56 is attached to the implement to prevent the sleeve 24 from moving to the left as viewed in FIG. 1. Other means for anchoring the sleeve against movement away from the implement can be used.

FIG. 1 illustrates the male and female couplings in their uncoupled positions. The valves 18 and 31 of the couplings close the fluid passages through the couplings. The housing 25 of the female coupling is maintained by the springs 45 and 46 in a position in which the locking portion 41 of the sleeve 24 forces the locking balls 38 inwardly.

Figure 2:
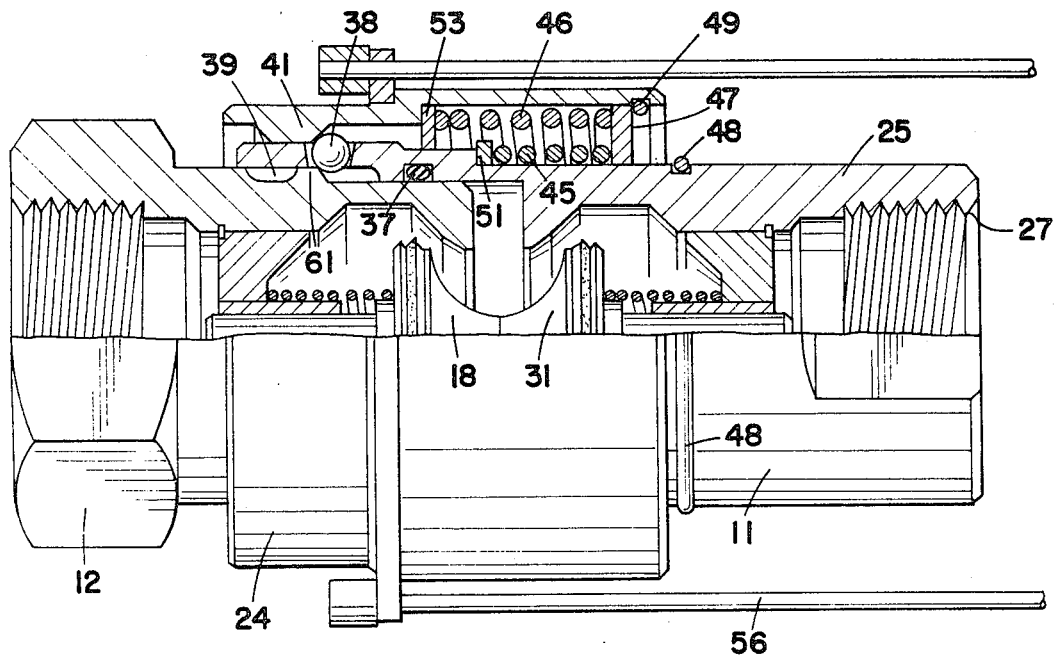
FIG. 2 is a view similar to FIG. 1 showing the male coupling partially connected to the female coupling.

FIG. 2 illustrates the couplings in a partially connected position. As the male coupling is inserted into the open end of the female coupling, a radially outwardly extending camming ramp 61 on the male coupling engages the locking balls 38 and moves the housing 25 to the right with respect to the sleeve 24. If the anchoring means for the sleeve 24, for example, the lanyard 56, is not designed to prevent movement of the sleeve to the right, the sleeve is grasped by one hand and the male coupling is grasped by the other hand. The inner coil spring 45 is compressed between the washers 47 and 51 as the housing 25 moves to the right. The washer 51 abuts the shoulder on the housing and moves to the right with the housing, and the washer 47 is prevented from moving to the right by the stop ring 49 on the sleeve. The outer coil spring 46 is not compressed as the housing moves to the right.

The valves 18 and 31 of the couplings are engaged in FIG. 2 and are moved away from their valve seats to open the fluid passages through the couplings. The O-ring 37 in the female coupling engages the male coupling to seal the couplings.

When the locking balls 38 are moved past the locking portion 41 of the sleeve as shown in FIG. 2, the locking balls can be cammed outwardly by the ramp 61 to permit the ramp to move past the balls. When the inner end of the male coupling engages the stop shoulder 62 of the female coupling, the locking balls will be aligned with the groove 39 in the male coupling. The connecting force on the male coupling can then be released, and the compressed coil spring 45 will force the housing 25 and the male coupling to the left toward the coupled position illustrated in FIG. 3. The locking balls will be cammed into the groove 39 of the male coupling by the camming surface 42 of the locking portion 41 on the sleeve, and the couplings will be locked together as shown in FIG. 3. The coil spring 45 will not move the housing 25 beyond the FIG. 3 position because of the engagement between the washers 51 and 53. The valves 18 and 31 of the couplings are held in fully open position.

It will be noted by comparing FIGS. 1 and 3 that the uncoupled position of the female coupling shown in FIG. 1 is the same as the coupled position shown in FIG. 3 with the exception of the position of the valve 31.

Figure 4:
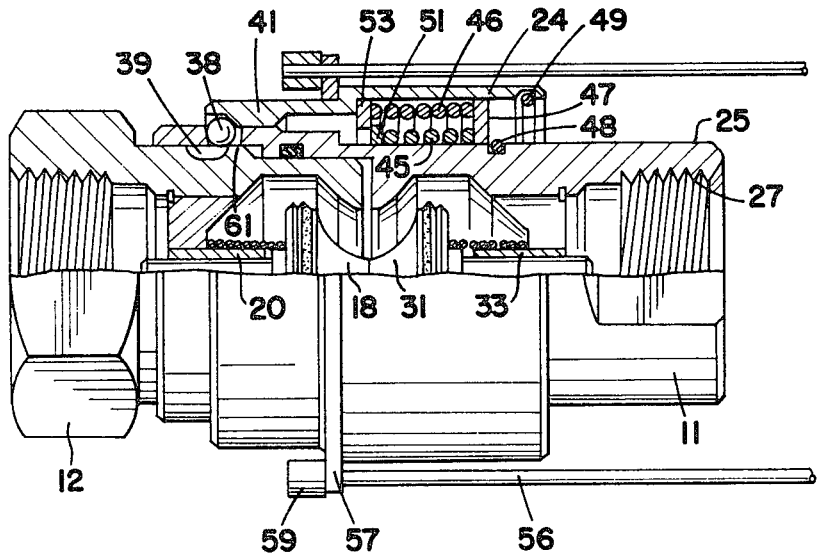
FIG. 4 is a view showing the male coupling partially disconnected from the female coupling.

When it is desired to disconnect the couplings, the male coupling is pulled sharply to the left. The lanyard 56 or other anchoring means will hold the sleeve 24, and the ramp 61 on the male coupling will engage the locking balls and pull the housing 25 to the left against the bias of both of the coil springs 45 and 46. FIG. 4 illustrates the couplings in a partially uncoupled position. As the housing 25 moves to the left, both springs are compressed by the washer 47, which is moved to the left by the stop ring 48. The washers 51 and 53 are held stationary by the stop shoulder 54 on the sleeve. When the locking balls 38 move past the locking portion 41 of the sleeve, the balls are cammed outwardly by the ramp 61 to permit the ramp to move past the balls. As the male coupling is withdrawn from the female coupling, the springs 45 and 46 return the housing 25 to the uncoupled position illustrated in FIG. 1. The locking balls are cammed inwardly by the camming surface 43 on the locking portion of the sleeve.

It is thus seen that two distinctly different forces are required to connect and to disconnect the couplings. The connecting force is controlled by the coil spring 45 (and to a minor extent by the valve springs 22 and 35, which can be relatively weak springs). The disconnecting force is controlled by both of the coil springs 45 and 46. The dfference between the connecting force and the disconnecting force can be adjusted as desired by selecting a coil spring 46 with an appropriate spring constant.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A quick disconnect female coupling for coaction with a male coupling, the female coupling comprising:
   an outer sleeve,
   a generally tubular housing slidably mounted within said sleeve and having an axially extending bore for receipt of said male coupling in one end thereof, the housing being movable axially with respect to the sleeve between partially uncoupled, coupled, and partially coupled positions,
   a valve seat in said bore,
   a valve slidably mounted within said bore and engageable with the valve seat for closing the bore,
   first and second spring means which are coil springs encircling the housing each with first and second ends between the housing and the outer sleeve for resiliently biasing the housing toward the coupled position wherein second spring means encircles said first spring means, the first spring means providing a first restoring force when the housing is between the coupled and the partially coupled positions for urging the housing toward the coupled position, the first and second spring means providing a second restoring force on the housing when the housing is between the coupled and the partially uncoupled positions for urging the housing toward the coupled position, the second restoring force being greater than the first restoring force, first stop means slidably mounted on the housing and engaging one end of the first spring for compressing the first spring, second stop means on the sleeve and engaging one end of the second spring for compressing the second spring, and third stop means engageable with the other ends of the first and second springs for compressing the first spring between the first and third stop means and for compressing the second spring between the second and third stop means, the first stop means being movable toward the third stop means when the housing moves from its uncoupled position to its partially coupled position whereby the first spring is compressed, the first stop means being engageable with the second stop means, and the third stop means being movable toward the first and second stop means when the housing moves from its coupled position to its partially uncoupled position whereby both the first and second springs are compressed.

2. The coupling of claim 1 in which the third stop means comprises an annular washer between the housing and the sleeve, a first stop ring mounted on the sleeve and engageable with the washer and a second stop ring mounted on the housing and engageable with the washer, the first stop ring preventing movement of the washer when the housing moves from its coupled position to its partially coupled position, the second stop ring moving the washer axially with respect to the sleeve when the housing moves from its coupled position to its partially uncoupled position.

3. The coupling of claim 1 in which the first stop means is a first annular washer slidably mounted on the housing, the housing including a shoulder engageable with the first washer for preventing sliding movement of the first washer in one direction, the second stop means is a second annular washer mounted on the sleeve closer to said open end of the housing than the first washer, the inside diameter of the second annular washer being less than the outside diameter of the first annular washer.

4. The coupling of claim 1 in which the housing is provided with a plurality of circumferentially spaced openings adjacent said one end thereof, a plurality of locking balls received in said openings, the sleeve including a radially inwardly extending locking portion engageable with the locking balls to force the balls into the openings, the locking portion being aligned with the openings when the housing is in its coupled position and including a pair of camming surfaces whereby the locking portion cams the locking balls radially inwardly when the housing moves from its partially coupled position to its coupled position and from its partially uncoupled position to its coupled position.

5. The coupling of claim 1 including anchor means on the sleeve for holding the sleeve against movement when the housing moves from its coupled position toward its partially uncoupled position.

* * * * *